US008458963B2

(12) United States Patent
Foss et al.

(10) Patent No.: US 8,458,963 B2
(45) Date of Patent: Jun. 11, 2013

(54) DEVICE FOR A BENDING MOMENT DEFICIENT STRUT CONNECTION

(75) Inventors: Gunnar Foss, The Hague (NL); Per Bull Haugsøen, Oslo (NO)

(73) Assignee: Owec Tower AS, Bergen (NO)

( * ) Notice: Subject to any disclaimer, the term of this patent is extended or adjusted under 35 U.S.C. 154(b) by 1685 days.

(21) Appl. No.: 11/630,869

(22) PCT Filed: Jun. 27, 2005

(86) PCT No.: PCT/NO2005/000231
§ 371 (c)(1),
(2), (4) Date: Dec. 22, 2006

(87) PCT Pub. No.: WO2006/004417
PCT Pub. Date: Jan. 12, 2006

(65) Prior Publication Data
US 2008/0028715 A1    Feb. 7, 2008

(30) Foreign Application Priority Data
Jul. 1, 2004   (NO) .................................. 20042775

(51) Int. Cl.
*E04H 12/08*  (2006.01)
*E04H 12/10*  (2006.01)
(52) U.S. Cl.
USPC ......... 52/40; 52/855; 52/110; 52/834; 290/55
(58) Field of Classification Search
USPC ................ 52/40, 855, 834, 110, 121; 290/55, 290/44
See application file for complete search history.

(56) References Cited

U.S. PATENT DOCUMENTS

| 546,710 | A | * | 9/1895 | Rogers | 74/103 |
| 1,334,485 | A | * | 3/1920 | Clipfell et al. | 290/55 |
| 4,082,479 | A | * | 4/1978 | Rangi et al. | 416/23 |
| 4,130,380 | A | * | 12/1978 | Kaiser | 416/197 A |
| 4,311,434 | A | * | 1/1982 | Abe | 416/142 |
| 4,323,331 | A | * | 4/1982 | Schachle et al. | 416/9 |
| 4,340,822 | A | * | 7/1982 | Gregg | 290/55 |
| 4,366,386 | A | * | 12/1982 | Hanson | 290/44 |
| 4,403,916 | A | * | 9/1983 | Skelskey | 416/14 |
| 4,410,806 | A | * | 10/1983 | Brulle | 290/44 |
| 4,495,423 | A | * | 1/1985 | Rogers | 290/44 |
| 4,557,629 | A | * | 12/1985 | Meek et al. | 405/204 |
| 4,575,311 | A | * | 3/1986 | Wood | 416/170 R |
| 4,729,716 | A | * | 3/1988 | Schmidt | 416/10 |

(Continued)

FOREIGN PATENT DOCUMENTS

| EP | 1101935 A2 | 5/2001 |
| EP | 1234978 A2 | 8/2002 |
| WO | WO 03/066427 A1 | 8/2003 |

*Primary Examiner* — Phi A

(74) *Attorney, Agent, or Firm* — Patents + TMS, P.C.

(57) ABSTRACT

A device for a diagonal strut connection between a pipe (12) and an adjacent structure (14) including at least two diagonal struts (16), in which horizontal and vertical forces in the pipe are transmitted to the diagonal strut by means of a first set of shear forces along the attachment of the diagonal strut (16) to the pipe (12) and via a second set of shear forces along the attachment of the diagonal strut to an annular plate (18) surrounding and projecting radially from the pipe (12), the central axis of the diagonal strut (16) extending through or close to the intersection of the resultants of the first and the second sets of shear forces.

8 Claims, 5 Drawing Sheets

U.S. PATENT DOCUMENTS

| | | | |
|---|---|---|---|
| 4,808,074 A * | 2/1989 | South | 416/140 |
| 5,072,555 A * | 12/1991 | Geiger | 52/82 |
| 5,182,458 A * | 1/1993 | McConachy | 290/55 |
| 5,244,346 A * | 9/1993 | Fergusson | 416/142 |
| 5,375,324 A * | 12/1994 | Wallace et al. | 29/889.21 |
| 5,531,567 A * | 7/1996 | Hulls | 416/87 |
| 5,832,688 A | 11/1998 | Crissey et al. | |
| 6,294,844 B1 * | 9/2001 | Lagerwey | 290/55 |
| 6,320,273 B1 * | 11/2001 | Nemec | 290/55 |
| 6,749,399 B2 * | 6/2004 | Heronemus | 416/41 |
| 6,929,450 B2 * | 8/2005 | Noble | 416/1 |
| 7,075,189 B2 * | 7/2006 | Heronemus et al. | 290/44 |
| 7,146,918 B2 * | 12/2006 | Meller | 114/39.26 |
| 7,156,586 B2 * | 1/2007 | Nim | 405/223.1 |
| 7,218,013 B2 * | 5/2007 | Platt | 290/55 |
| 2002/0095878 A1 * | 7/2002 | Henderson | 52/116 |
| 2003/0168864 A1 * | 9/2003 | Heronemus et al. | 290/55 |
| 2005/0019163 A1 * | 1/2005 | Heronemus | 416/44 |
| 2006/0277843 A1 * | 12/2006 | Livingston et al. | 52/110 |
| 2007/0095008 A1 * | 5/2007 | Arsene | 52/745.04 |
| 2007/0151194 A1 * | 7/2007 | Livingston et al. | 52/651.05 |
| 2007/0175134 A1 * | 8/2007 | Christenson | 52/292 |
| 2007/0212171 A1 * | 9/2007 | Rasmussen | 405/237 |
| 2008/0072511 A1 * | 3/2008 | Phuly | 52/294 |
| 2008/0078128 A1 * | 4/2008 | Livingston et al. | 52/40 |
| 2008/0150292 A1 * | 6/2008 | Fedor et al. | 290/55 |
| 2008/0246284 A1 * | 10/2008 | Pelman et al. | 290/55 |

* cited by examiner

DEVICE FOR A BENDING MOMENT DEFICIENT STRUT CONNECTION

This invention relates to a bending-moment-deficient strut connection. More particularly, it concerns a strut connection forming part of a connection between a supporting structure and an adjacent structure, in which the adjacent structure may be a trusswork structure, for example.

The device is illustrated hereinafter by means of a supporting tower structure of a windmill, a structure of this kind adequately showing the challenges addressed by the invention. The invention is not limited to a tower for windmills, but can be used in a number of structures, in which similar force patterns exist.

To avoid collision with the blades of the windmill, the upper portion of a windmill tower must be formed as a slim structure. From land-based windmills it is known that this slim structure, which is often formed by a pipe, is connected to a base in the ground.

When windmills are placed off shore and more often in relatively deep water, it is not practical to use one pipe extending from the base of the windmill up to the nacelle of the windmill.

Therefore, the supporting tower structure of known windmills that are placed off shore, often comprises a tubular upper portion and a lower portion, in which the lower portion may be formed by a trusswork structure, for example.

The transition between the upper slim portion of the tower and the lower structure is often formed by a relatively heavy and complicated structure. The reason is, among other things, that construction principles that are known from sea-based oil recovery equipment, are applied. Such equipment is dimensioned for considerable wave forces and for handling heavy equipment, and for allowing personnel to be present on the structure at all times.

In windmill installations it is, also off shore, normally the wind forces that determine the design of the structure.

Transitions of this prior art are relatively soft. They have to be adjusted in such a way that the natural period of the tower will be short enough for the windmill concerned. This contributes to a further increase in the weight of the tower.

The invention has as its object to remedy or reduce at least one of the drawbacks of the prior art.

The object is achieved in accordance with the invention through the features specified in the description below and in the following Claims.

A cylindrical or conical pipe is connected to an adjacent structure by means of tubular diagonal struts. The diagonal struts are connected to the pipe by means of an annular plate projecting outwards from and encircling the pipe.

The diagonal struts are placed in such a way that the axial central line of the diagonal strut extends through the pipe wall near the circle of attachment of the annular plate to the pipe. Thus, the diagonal strut has been given a shape so that roughly one half of the projected circumference of the diagonal strut is connected to the pipe, whereas the remaining portion of the projected pipe circumference is connected to the annular plate.

The diagonal struts, the pipe and the annular plate are typically connected by means of weld joints, but may also be formed by moulded connections. For practical reasons the welding seam may be continuous or divided.

The pipe and the annular plate are produced from a material of a relatively small thickness. Thus, essentially only membrane stresses will occur in the joints between the diagonal strut and the two details mentioned.

If it is taken as a starting point that the pipe stands vertically and that the annular plate thereby encircles the pipe in the horizontal plane, the vertical force is transmitted from the pipe to the diagonal strut by a first set of shear forces along the connecting line between the diagonal strut and the pipe, whereas the horizontal force is transmitted from the pipe to the annular plate and further on to the diagonal strut via a second set of shear forces between the diagonal strut and the annular plate. The annular plate is sufficiently rigid for the pipe to maintain its circular shape, even though the diagonal strut works only on a limited part of the circumference of the pipe.

As the central line of the diagonal strut runs through the intersection of the resultants of the shear forces mentioned, the diagonal strut is, in the main, not subjected to a bending moment at its attachment to the pipe. This condition simplifies, to a substantial degree, the connection between the pipe and the adjacent structure.

In a preferred embodiment, in which the diagonal strut corresponds with the main columns of a trusswork structure, the pipe is passed through the annular plate and on (down) to a torsion plate. The torsion plate is further connected to the trusswork structure in the region where the diagonal struts are connected to the structure. The torsion plate is designed to absorb torques about the central axis of the pipe, but essentially do not absorb axial forces from the pipe.

A force working radially on the pipe, will cause the creation of a bending moment in the pipe. The bending moment causes the creation of a force pair which is absorbed by the annular plate and the torsion plate. Vertical forces in the pipe are absorbed, as described above, only by the diagonal struts.

To be able to absorb lateral forces and axial forces, the pipe must be provided with two or more diagonal struts. In a structure which is exposed to forces from several directions there must be at least three struts.

If the lower portion of the tower includes a trusswork structure, it is advantageous for the central lines of the main column to meet at the point where a lateral force on the tower is working, for example from the turbine of the windmill. Thereby, the horizontal force is divided into tensile forces and compressive forces in the main columns, whereby the struts of the trusswork are subjected to forces only to a minor degree. Thus, it may be advantageous for compressive forces in the trusswork to be absorbed by compression rods, whereas tensile forces are absorbed by tie rods in the form of tightened ropes.

Such compression rods and ropes may be connected to the columns by means of mechanical connecting elements, for example bolt connections. This renders welding superfluous, to a substantial degree, and provides for a rational production of the trusswork.

The nodes of the trusswork may be welded, moulded or cold-formed, for example.

It may be advantageous to arrange the diagonal struts in such a way that their central lines extend coaxially with their connected column from the column to the pipe. As far as a windmill is concerned, such a structure involves that the diagonal struts may get in the way of the turbine blades. In that case, the central axis of the windmill turbine must point somewhat upwards in order for the blades of the turbine to rotate freely.

The above-mentioned structural features have the effect that forces can be transmitted between a pipe and an adjacent structure by means of a relatively light connection. Compared with known structures, this structure exhibits a considerably improved rigidity.

During the installation of a support on the sea bed, it is common to drive down piles through the guide attached to the trusswork. Such work causes vibrations that are harmful to a possible turbine already mounted.

According to the invention, piles may be driven into the sea bed before the tower is mounted, as the tower is provided at its lower portion with sleeves that are open at their lower portions and that fit complementarily over the piles. The sleeves are preferably formed with annular stops that will abut the upper edge of the pile. The piles are driven down to the same elevation and the tower will, thereby, automatically be vertical. The sleeves are attached to the piles by, for example, injecting concrete between the sleeves and the piles.

In waters where ice occurs, the ice that forms about a tower having one column in the sea, a so-called monotower, will normally be broken up by means of a conical element, so that the horizontal forces from the ice are minimized. A corresponding conical element may be mounted on each main column. In a trusswork tower of the kind described above, the compression rods and tie rods will possibly also be subjected to ice forces. It may, therefore, be advantageous for the trusswork to be formed without struts in a zone where the ice will be working. The increased flexibility that this will entail in the trusswork structure, may, within certain limits, be compensated for in a manner known in itself.

Further, it is of great importance practically and costwise for as many towers as possible to be built identically in serial production. If the respective towers are to be used at different water depths, this could be compensated for by piles, which are possibly preinstalled, having a length which is adjusted to the water depth, so that, fully installed, identically built towers will have the same height above the water surface.

Expensive erosion protection in the form of, for example, gravel often has to be laid around the structure on the sea bed. Normally, the erosion depth is 1.5 times the diameter of a structural element, for example the diameter of a monopile, if no erosion protection has been laid out. The structure in question may be designed for erosion corresponding to 1.5 times the diameter of piles or main columns as these have a considerably smaller diameter, for example 1 meter, than the diameter of a monotower, for example 4.5 m.

In what follows, there is described a non-limiting example of a preferred embodiment which is visualized in the accompanying drawings, in which.

Figure 1:
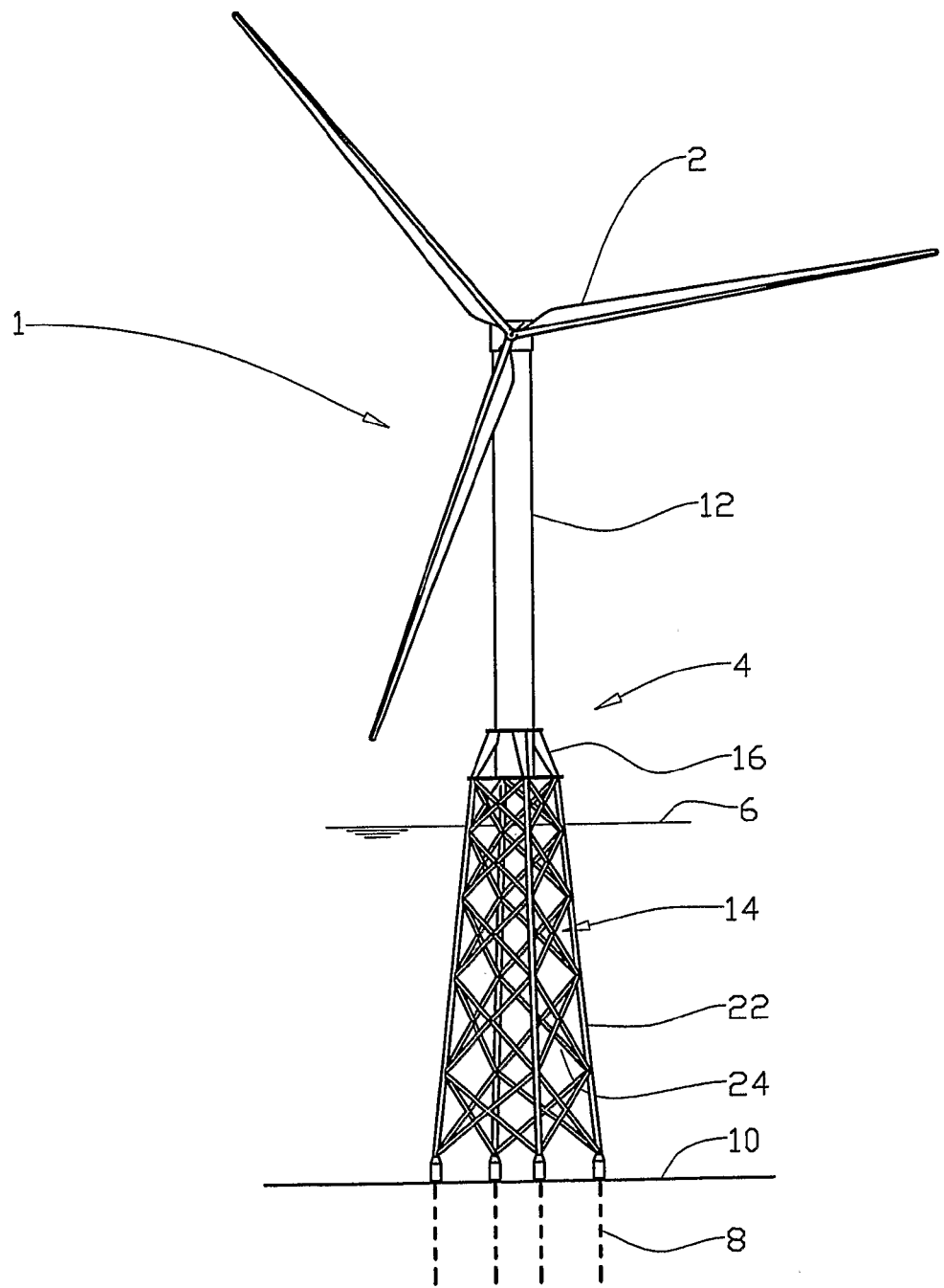
FIG. 1 shows a windmill which is placed in a region of relatively deep water, the tower of the windmill including an upper pipe column and a lower trusswork structure.

In the drawings the reference numeral 1 identifies a windmill including a turbine 2 and a tower 4. The tower 4 of the windmill 1 is partially submerged below the sea surface 6. The tower 4 is connected to piles 8 which have been driven into the sea bed 10.

The tower 4 includes an upper vertical pipe 12 and lower trusswork 14.

Figure 2:
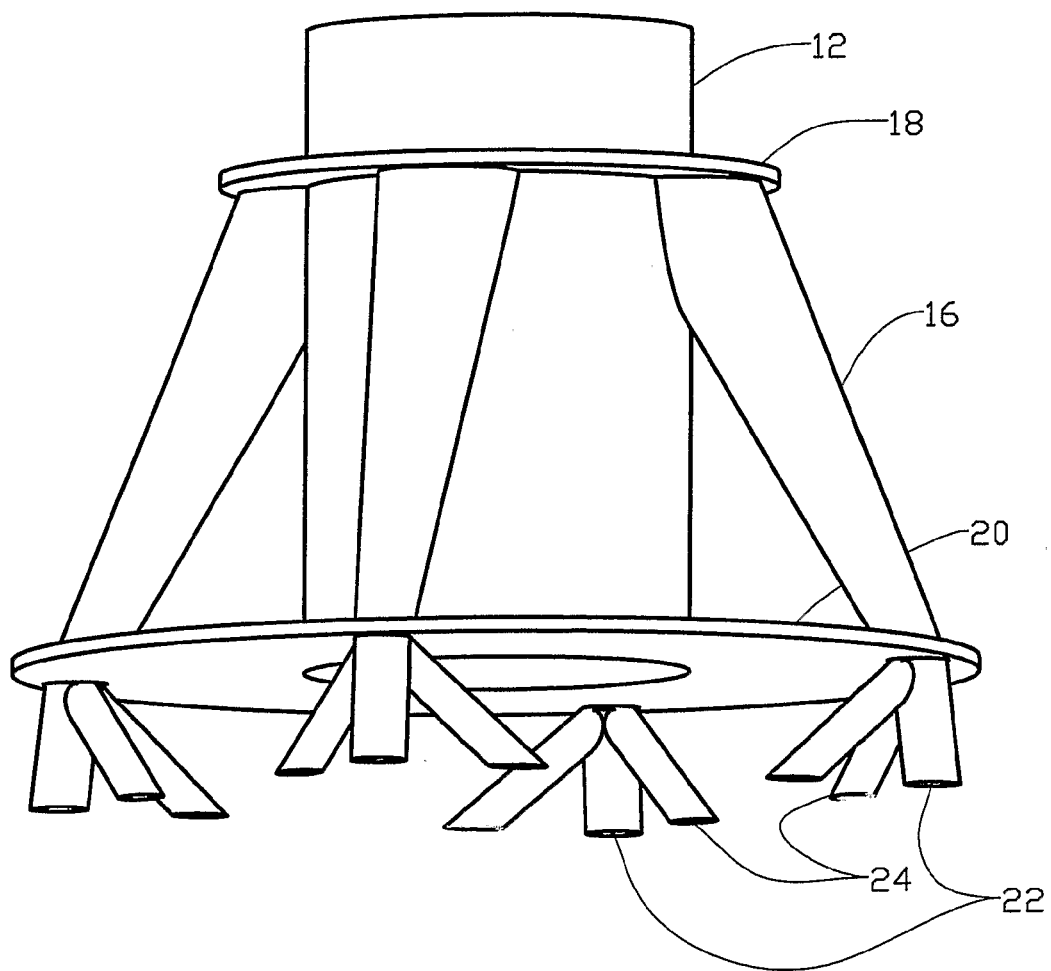
FIG. 2 shows on a larger scale, viewed from one side and at an upward angle, a section of the area at the transition between the pipe column and the trusswork.

The pipe 12 is connected to the trusswork by means of hollow diagonal struts 16, an annular plate 18 and a torsion plate 20, see FIG. 2. Both the ring plate 18 and the torsion plate 20 encircle and project radially from the pipe 12. The annular plate 18 is located at a level somewhat higher up than the torsion plate 20, the torsion plate 20 being connected to the main columns 22 of the trusswork 14.

The diagonal struts 16 each extend from a respective main column 22 up to the pipe 12 and the annular plate 18, the central axis of the diagonal struts 16 intersecting the pipe 12 near the connecting line of the annular plate 18 to the pipe 12 (see below).

The pipe 12, diagonal struts 16, annular plate 18 and torsion plate 20 are all made of a relatively thin material, so that the stresses between them are mainly made up of membrane stresses.

Figure 3:
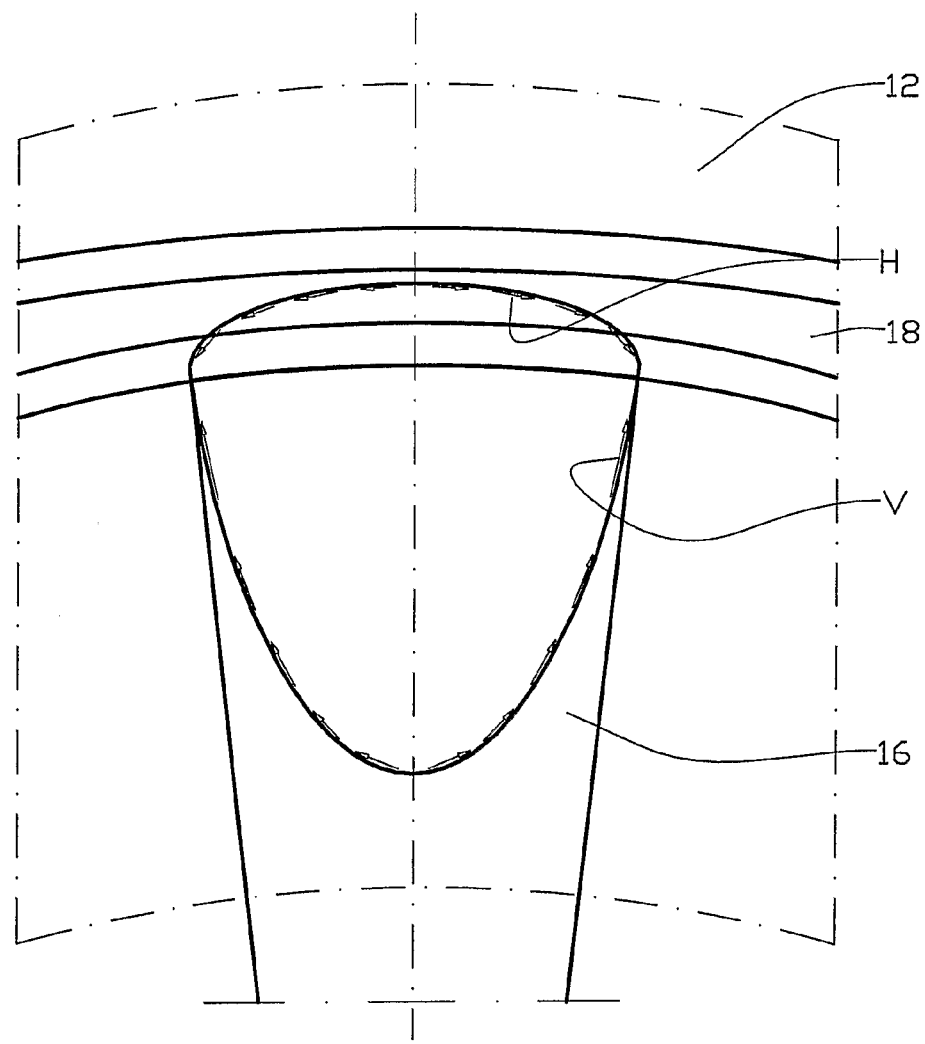
FIG. 3 shows a sketch, viewed radially outwards from inside the pipe and at an downward angle, in which the shear forces between the diagonal strut and the pipe column, respectively the diagonal strut and the annular plate, are indicated by arrows, the details in the sketch being shown transparently.

Torsional forces in the pipe 12 are transmitted to the trusswork 14 via the torsion plate 20. Vertical forces in the pipe 12 are transmitted to the diagonal struts 16 via first shear forces V, see FIG. 3, at the attachment between the pipe 12 and the diagonal strut 16. Horizontal forces working on the pipe 12 create a bending moment in the pipe 12. This bending moment is absorbed by a force pair between the annular plate 18 and the torsion plate 20. From the annular plate 18 this horizontal force is transmitted to the diagonal struts 16 by means of second shear forces H, see FIG. 3, between the annular plate 18 and the diagonal struts 16.

Figure 4:
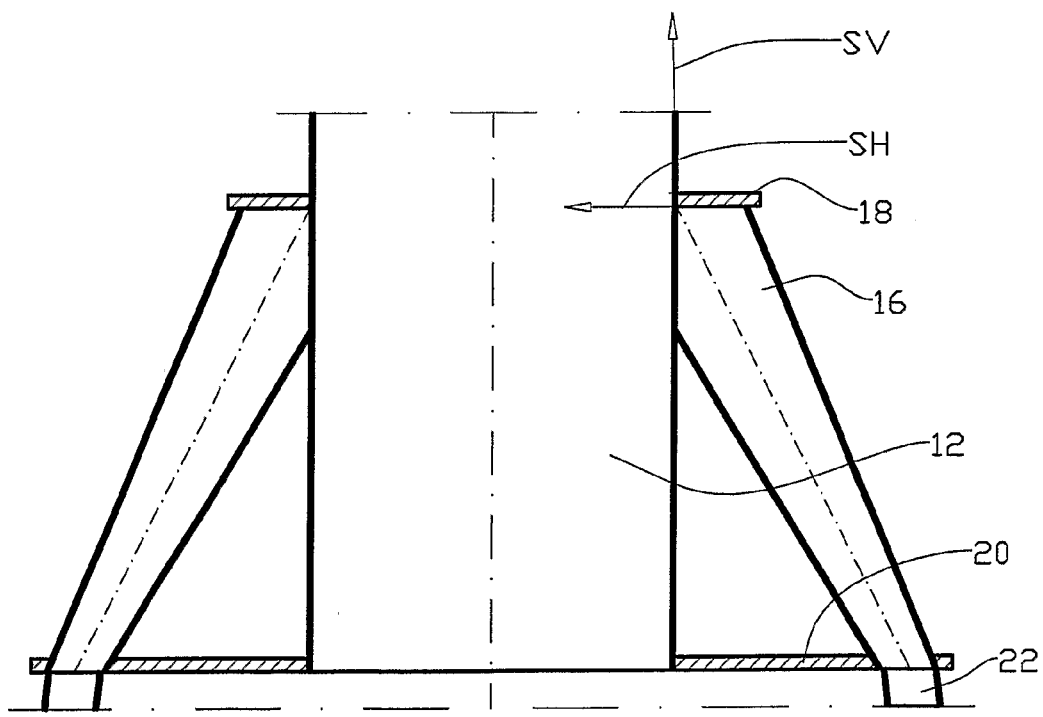
FIG. 4 shows a section through the pipe and two diagonal struts, in which the first and the second resulting shear forces intersect at the central axis of the diagonal strut.
Figure 5:
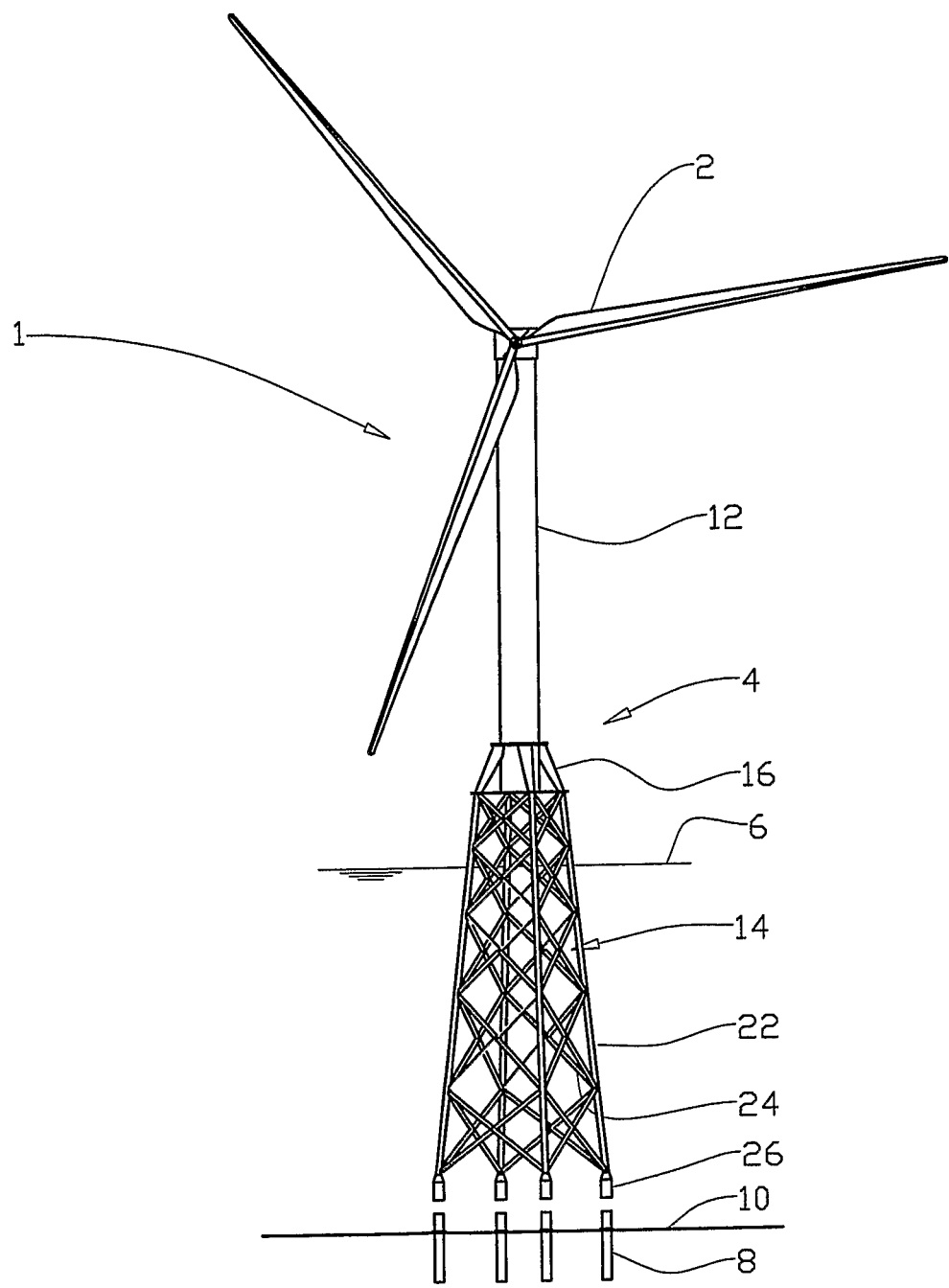
FIG. 5 shows the windmill of FIG. 1 during installation on piles which has been driven into the sea bed in advance.

The resultant of the first shear stresses V is represented in FIG. 4 by the force SV, whereas the resultant of the second shear forces H is represented by the force SH. The force SH is normally not completely vertical, as the part of the diagonal strut 16 connected to the pipe 12 follows the cylindrical surface of the pipe 12. The resulting force from the forces SV and SH works on the diagonal strut 16. The central line of the diagonal strut 16 cuts through the intersection of the forces SV and SH. Thereby, the diagonal struts 16 are subjected to bending moment at the attachment to the pipe 12 only to an insignificant degree.

The trusswork 14 comprising, besides the main columns 22, struts 24, is provided with a number of sleeves 26 at its lower portion. The sleeves 26 which are provided with stops, not shown, are arranged to be moved down on piles 8, the piles having been driven into the sea bed 10 in advance. Stops are arranged to make the tower automatically be vertical when the piles have been driven to the same vertical elevation. The sleeves 26 may be attached to the piles 8 by means of, for example, concrete.

The invention claimed is:

1. A device for a diagonal strut connection between a pipe and an adjacent structure wherein the pipe has a circular shape and further wherein the pipe has horizontal and vertical forces, the device comprising:
    an annular plate attached to the pipe wherein the annular plate encircles and projects radially from the pipe; and
    at least two diagonal struts attached to the pipe and the annular plate wherein each of the diagonal struts has a central axis wherein the horizontal forces in the pipe are transmitted to the diagonal struts by means of a first set of shear forces along an attachment of the diagonal struts to the annular plate wherein the vertical forces in the pipe are transmitted to the diagonal struts by means of a second set of shear forces along an attachment of the diagonal struts to the pipe wherein the central axis of the diagonal struts extends through or proximate to an intersection of the first set and the second set of shear forces.

2. The device of claim 1 wherein the annular plate has a rigidity that maintains the circular shape of the pipe.

3. The device of claim 1 further comprising:
   a torsion plate arranged at a distance from the annular plate wherein the torsion plate absorbs torques in the pipe.

4. The device of claim 3 wherein the annular plate and the torsion plate are arranged to absorb a pair of forces in a radial direction of the pipe.

5. The device of claim 1 wherein the adjacent structure is formed by a trusswork structure having main columns and struts.

6. The device of claim 5 further comprising:
   central lines of the main columns that intersect at or close to a point on a central axis of a turbine.

7. The device of claim 5 wherein the struts of the trusswork structure have compressive rods and tie rods wherein at least one of the tie rods is formed by a rope strut.

8. The device of claim 5 wherein the trusswork structure is provided, at its lower portion, with sleeves complementarily fitting over respective piles.

\* \* \* \* \*